US006378012B1

(12) United States Patent
Bass et al.

(10) Patent No.: US 6,378,012 B1
(45) Date of Patent: Apr. 23, 2002

(54) INTERFACE WITH DATA TRANSMISSION MODE FROM WEIGHING SCALE TO ONE OR MORE PERIPHERAL DEVICES AND MAILING MACHINE TRIPPING MODE DETERMINED BY INDIVIDUAL PERIPHERAL DEVICE PROTOCOL

(76) Inventors: Edward R. Bass, 320 Putting Green Rd., Trumbull, CT (US) 06611; Jonathan R. Ison, Dower House, High Street, Newport Essex (GB), CM 113; Konstantin G. Kodonas, 26 Friendly Rd., Norwalk, CT (US) 06851; Vincent R. Weis, 11 Kelly Ct., Sandy Hook, CT (US) 06482

( * ) Notice: Subject to any disclaimer, the term of this patent is extended or adjusted under 35 U.S.C. 154(b) by 0 days.

(21) Appl. No.: 09/182,904

(22) Filed: Oct. 29, 1998

(51) Int. Cl.[7] ......................... G06F 13/00; G06F 13/12; G06F 13/42; G06F 17/00; G06F 19/00

(52) U.S. Cl. ............................ 710/72; 710/14; 710/62; 710/65; 710/105; 710/129; 705/60; 705/401; 705/410

(58) Field of Search ................................ 705/401, 410, 705/60, 131; 710/11, 62, 65, 71, 72, 105, 106, 129, 131, 14

(56) References Cited

U.S. PATENT DOCUMENTS 3,978,457 A * 8/1976 Check, Jr. et al. ....... 340/172.5
4,135,662 A * 1/1979 Dlugos ....................... 235/304
4,301,507 A 11/1981 Soderberg et al. .......... 364/464
4,395,756 A 7/1983 Daniels et al. .............. 364/200
4,399,538 A * 8/1983 Cholakian et al. ............ 371/66
4,410,961 A 10/1983 Dlugos et al. .............. 364/900
4,466,079 A * 8/1984 Daniels et al. .............. 364/900
4,500,933 A * 2/1985 Chan ........................... 360/69
4,513,373 A 4/1985 Sheets
4,535,421 A * 8/1985 Duwel et al. ............... 364/900
4,569,022 A * 2/1986 Coppola et al. ............ 364/466
4,603,400 A 7/1986 Daniels et al. ............. 364/900
4,642,791 A 2/1987 Mallozzi et al. ............ 364/900
5,121,327 A * 6/1992 Salazar .................. 364/464.02
5,666,292 A * 9/1997 Hunter et al. ................. 710/62
5,729,204 A * 3/1998 Fackler et al. ......... 340/825.04
5,737,426 A * 4/1998 Brookner et al. ............. 380/51
5,870,626 A * 2/1999 Lebeau ....................... 395/831
5,940,478 A * 8/1999 Vaudreuil et al. ........ 379/88.18
5,956,391 A * 9/1999 Melen et al. ............... 379/114
5,964,852 A * 10/1999 Overton ....................... 710/62
6,029,155 A * 2/2000 Bass et al. .................. 705/401
6,076,081 A * 6/2000 Bass et al. .................. 705/401

FOREIGN PATENT DOCUMENTS

EP 0717539 6/1996
WO WO 98/12640 3/1998

* cited by examiner

*Primary Examiner*—Thomas Lee
*Assistant Examiner*—Tanh Nguyen

(57) ABSTRACT

A method and apparatus for interfacing a weighing scale and one or more peripheral devices which includes a single intelligent interface cable assembly connected between a weighing scale and a plurality of peripheral devices, the IICA detects the peripheral device protocol by receiving a logic signal indicating which protocol is in operation, if necessary, the IICA then switches the signal protocol of the weighing scale to correspond with the signal protocol of the detected peripheral device protocol. Simultaneous, tripping of a mailing machine to print postage amounts may occur.

18 Claims, 4 Drawing Sheets

INTERFACE WITH DATA TRANSMISSION MODE FROM WEIGHING SCALE TO ONE OR MORE PERIPHERAL DEVICES AND MAILING MACHINE TRIPPING MODE DETERMINED BY INDIVIDUAL PERIPHERAL DEVICE PROTOCOL

FIELD OF THE INVENTION

The invention disclosed herein relates generally to postage scales adapted to weigh an article and determine the appropriate postage to be applied thereto. More particularly, the present invention relates to an interface which establishes communication between incompatible systems. Specifically, the present invention is directed to a single cable interface, which enables a plurality of incompatible peripheral devices to communicate with an associated postage scale system processor.

BACKGROUND OF THE INVENTION

Various postal systems for automatically determining proper postage and interfacing with mailing system peripherals are well known in the art. One such system is disclosed in U.S. Pat. No. 4,395,756 issued to Edward P. Daniels, on Jul. 26, 1983, which describes a microprocessor based system with: a keyboard and display; a scale subsystem processor forming part of a weighing cell, for providing weight information in digital form to the system processor; and, a plurality of peripheral postal devices interfaced to the postal system processor. Another similar system is disclosed in U.S. Pat. No. 4,603,400 issued to Edward P. Daniels on Jul. 29, 1986, disclosing a microprocessor based system with: a keyboard and display; a scale weighing device operatively connected to the system processor; and, postage printing subsystem and peripheral subsystem processors connected to the system processor through a serial communications interface.

The above systems are fully integrated systems and designed to interface with compatible machines. The fully integrated systems are not capable of functioning separately nor are they interchangeable with other peripheral systems.

With increased interest in creating solutions for specific mailing systems to meet individual customer requests, a need to interface postal scale mailing systems with a variety of mailing system peripherals has developed. In many instances, these systems operate under different protocols and thus, are incompatible. One solution to this problem is disclosed in U.S. Pat. No. 4,642,791 issued to Mallozzi et al., on Feb. 10, 1987. This patent discloses an interface that provides communication between a weighing cell providing weight information in the form of code digits representative of arbitrary weight units and optically coupled interface adapter ports which have separate input and output lines.

Another such system is disclosed in U.S. Pat. No. 4,301,507 issued to John H. Soderberg on Nov. 17, 1981, disclosing a serial communications port and a plurality of external devices in which the communications procedure disclosed relates to serial transmission of data and bit by bit return of such data to the transmitter verification. A daisy chain is operatively connected between a plurality of external devices and an associated control is described. However, a communications buffer comprising a daisy chain undesirably prolongs the period of time for transmission of data and increases the possibility of a transmission error.

Yet another such solution is described in U.S. Pat. No. 4,410,961 issued to Dlugos et al., on Oct. 18, 1983 which discloses an interface adapted to interconnect the system processor with a plurality of mailing system peripheral devices. The interface includes a peripheral microcomputer which receives data and command signals from the processor of a scale which communicates through an Echoplex protocol. A multiplexer interconnects the peripheral transmit line of the microcomputer with a selected peripheral device, while an additional multiplexer interconnects the peripheral receive line of the microcomputer with the selected peripheral device. However, only communication between an Echoplex scale and either Echoplex or RS232 peripheral devices is disclosed. A significant disadvantage with this system is that this system requires the user to predetermine and preselect what communication subroutines are necessary to be implemented in order to achieve successful communication. However, with the introduction of a scale which communicates through PB232 protocol a need arose to convert the PB232 protocol to Echoplex protocol.

Further interest in user customized mailing systems, has prompted greater need for allowing the user to interchange a plurality of systems such that features of one system may be used in combination with features of another system. Achieving proper communication between such systems has also created a need for a device that will facilitate proper protocol switching. One particularly desirable interface would provide for the interconnection and communication between a PB232 protocol scale and mailing system peripherals which communicate in either PB232 or Echoplex protocols. Multi-cable interfaces as described in the prior art are difficult to install, asthetically unappealing, and costly.

Based upon the foregoing reasons, it will be appreciated that it is an object of the present invention to provide a single communications interface between a postage value determining system processor and a plurality of peripheral devices associated with a mailing system which is not subject to the disadvantages of the prior art.

Another object of the present invention, is to provide a single interface between a postage value determining system processor and a plurality of peripheral devices associated with a mailing system which allows the system processor to communicate irrespective of the processor protocol.

Thus, it is an object of this invention to provide an interface between a PB232 scale and mailing system peripherals, which use either PB232 or Echoplex protocols.

It is a further object of this invention to provide an interface that allows a PB232 scale to detect whether it is connected to a PB232 or Echoplex protocol peripheral and can automatically switch between Echoplex and PB232 protocols.

Other objects and advantages of the present invention will be apparent from the detailed description considered in conjunction with the preferred embodiment of the invention illustrated in the drawings, as follows.

SUMMARY OF THE INVENTION

The above and other objects of this invention are achieved and the disadvantages of the prior art are overcome by means of an intelligent interface cable assembly (hereinafter IICA) between a postage scale system and a plurality of mailing system peripherals. The present invention includes an interface circuit board, which interconnects a postage value determining system processor with a plurality of peripheral devices associated with a mailing system. An IICA is configured to allow a postage scale mailing system such as a PB232 scale to detect the associated peripheral mailing system protocol. The peripheral protocol may be either PB232 protocol or Echoplex protocol. Once the IICA determines whether the peripheral protocol is Echoplex or PB232, the IICA establishes communication between the PB232 scale and the variety of peripheral devices, by converting the PB232 scale protocol to the protocol of the peripheral device, such as for example, either Echoplex or RS232 protocol.

The IICA is situated between the postage scale system and any one of a plurality of mailing system peripherals. The IICA detects which signal protocol is in present operation. Based upon detecting what signal is received from the peripherals, the IICA then switches to the postage system signal, which corresponds to the signal of the peripheral, thus enabling communication. In typical operation, the postage scale is an RS232 protocol while the mailing system peripherals are either RS232 protocol or Echoplex protocol. RS232 and Echoplex protocols are well known in the art, a detailed description of the individual protocols is not necessary for an understanding of this invention. In general, Ecoplex protocol is serial character asynchronous, bit synchronous, in message form, with the bits of the message being timed in accordance with a given schedule. The messages are returned or echoed by the recipient, bit by bit, for checking. While the PB232 protocol is a variation of the RS232 Protocol, wherein, not all of the available RS232 signals are used, however, voltage levels remain the same.

The IICA includes a circuit board that has both an RS232 to Echoplex converter, and an Echoplex to RS232 converter. The IICA maintains a physical connection at both the scale and the peripheral device through physical ports having multiple pins. The IICA as described in this invention is provided within one cable assembly. However, the IICA may also be included as an internal connection within the postage scale system circuit board or within the circuit board of the mailing system peripherals.

In one operation, the IICA receives a RS232 message on its associated port, detects the peripheral protocol, and then outputs the message to the peripheral device. Conversely, the IICA will also receive Echoplex messages on its associated port, detect the peripheral device copular protocol, convert the input signal to the equivalent Echoplex format, and output the converted signal on the associated Echoplex port.

The IICA also provides trip circuitry to allow scales communicating via PB232, the ability to not only set Echoplex or PB232 protocol, but, also to trip a mailing machine for printing postage. When a set dollar value amount is transmitted to an electronic postage meter, a request for the value set is then transmitted to the meter. The microcomputer awaits receipt of a signal indicating the amount which has been set by the meter; this value is then transmitted to the system processor for comparison with the set value originally transmitted. Upon a trip command, the microcomputer transmits a trip signal to a mailing machine for tripping the meter and awaits receipt of a meter trip complete signal from the postage meter. In the present invention, the mailing machine trip may originate from the IICA or from the peripheral device depending upon whether the IICA detects a PB232 protocol or an Echoplex protocol.

A plurality of communications subroutines are stored in the microcomputer program memory. Thus, versatility in the selection of peripherals which may be employed in conjunction with a stand-alone postage scale is desirable and by present invention available. A system output line is provided for communications with a peripheral device employing either the RS232 or Echoplex communications.

These and other objects and advantages of the present invention will become more apparent from an understanding of the following description of a presently preferred mode of carrying out the invention when considered in conjunction with the accompanying drawings.

BRIEF DESCRIPTION OF THE DRAWINGS

The above and other objects and advantages of the present invention will be apparent upon consideration of the following detailed description, taken in conjunction with accompanying drawings, in which like reference characters refer to like parts throughout, and in which.

DESCRIPTION OF THE PREFERRED EMBODIMENT

Figure 1:
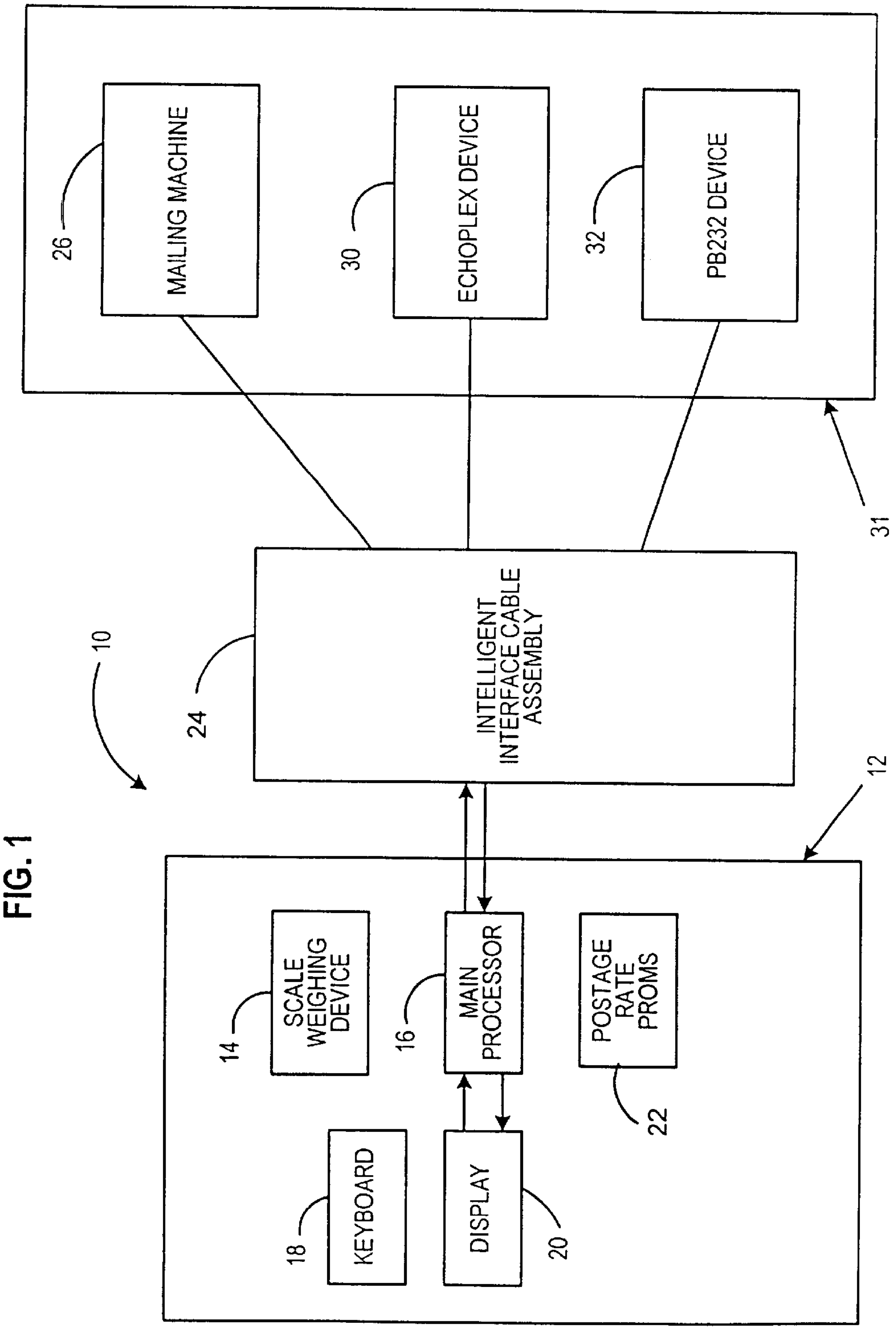
FIG. 1 is a schematized block diagram of a typical mailing system and schematically illustrates the intelligent interface cable assembly constructed in accordance with and embodying the present invention interconnecting a postage value determining system processor associated with a postage scale and a plurality of mailing system peripheral devices.

Referring now in detail to the drawings, the reference numeral 10 of FIG. 1 denotes generally an automated mailing system including a processor controlled stand alone postage scale 12. The postage scale 12 is adapted to calculate the postage or other transportation charges required to transport an article. In most instances, transportation charges are based upon the article weight, class of transportation and, with respect to certain classes, distance to destination (zone). The postage scale 12 includes weighing device 14 having a tray or platform adapted to receive the article to be mailed. The weighing device 14 is interconnected to a main system processor 16. Main system processor 16 is programmed to compute the requisite postage or other transportation charges for an article placed upon the platform.

The data necessary for the determination of article postage (e.g. destination operands, class of transportation operands, etc.), is entered at keyboard 18 and corresponding signals are transmitted to the main system processor 16. Keyboard entries and calculated information are indicated at a display 20.

With the weight, class of transportation and destination zone operands entered, main system processor 16 determines the requisite postage by reference to a postage rate PROM 22 and provides a signal to display 20 for indicating the calculated postage amount. A suitable microprocessor for implementation as main system processor 16 is an Intel 8085 processor available from Intel Corporation of Santa Clara, Calif. The foregoing mode of operation of postage scale 12 is well known to those of skill in the art and typically illustrated in U.S. Pat. No. 4,135,662 entitled Operator Prompting System issued Jan. 23, 1979 to Daniel F. Dlugos and assigned to the assignee of the present invention.

The postage value determining system processor disclosed in U.S. Pat. No. 4,135,662, supra, was an integral part of a complete mailing system and transmitted a postage value signal to a meter setting device for setting a postage meter and dispensing the calculated postage.

Pursuant to the present invention, postage scale 12 is constructed as a stand alone unit for use without peripheral devices associated with a complete mailing system, yet maintains versatility for controlling, transmitting data to, and receiving data from, various peripheral devices if a complete mailing system is desired by the user.

An intelligent interface cable assembly 24 (hereinafter IICA) is provided as a separate, self-contained, single cable assembly and is adapted to establish communication links between the main system processor 16 and various mailing system peripheral devices 31. Peripheral devices 31 may include one or more electronic postage meters 30, 32. A mailing machine 26 may also be connected to the system. IICA 24 may also be co-located with peripheral devices 31 (such as devices 30 and 32). The Peripheral devices may be for example Echoplex electronic postage meter 30, or PB232 electronic postage meter 32.

Electronic postage meters of this general type are described in U.S. Pat. No. 3,978,457 entitled Microcomputerized Electronic Postage Meter System issued Aug. 31, 1976 to Frank P. Check, Jr. et al. and assigned to the assignee of the present invention. Echoplex electronic postage meter 30 is programmed for communication with the main system processor 16 pursuant to communications routine disclosed in U.S. Pat. No. 4,301,507 previously referred to.

The communications routine is serial character asynchronous, bit synchronous, in message form, with the bits of the message being timed in accordance with a given schedule. The messages are returned or echoed by the recipient, bit by bit, for checking. This communications routine has been designated "Echoplex."

PB232 electronic postage meters 32 is programmed pursuant to the PB232 communications routine developed by Pitney Bowes Inc, (a company located at, One Elmcroft Road, Stamford, Conn.). PB232 is a modification of communications routine RS232 which is well known in the art. This section summarizes the design objectives which have influenced the final design of this protocol. PB232 is intended for use in point-to-point applications only. It contains no provisions for multi-drop applications. PB232 is designed to be able to transmit and receive binary data as simply as possible. Thus, this is a fundamentally 8-bit protocol, since there are many applications in which 8-bit binary data needs to be transported. PB232 is designed to be implemented by standard hardware, cope with errors in transmission, and to require the minimum possible processing in the case of a retransmission and use a minimum of timeout processing in order to maintain end-to-end synchronization. In the interests of simplicity, the protocol is designed to permit only one outstanding message in a particular direction at a time.

Figure 2:
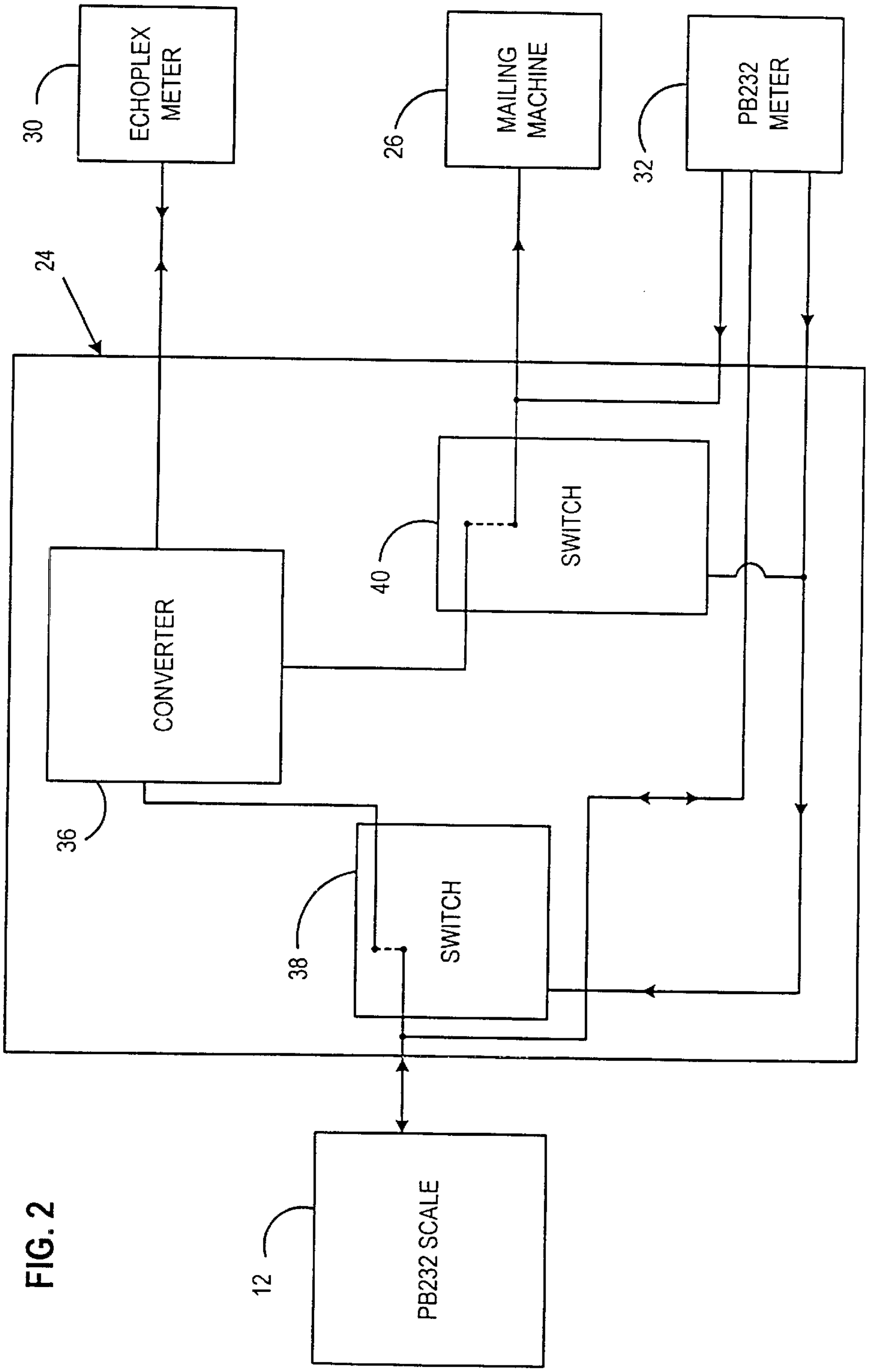
FIG. 2 is a block diagram of the printed circuit board of the intelligent interface cable assembly.

Now, turning to FIG. 2, a schematized block diagram of IICA 24 is illustrated. The IICA 24 includes analog switches 38 and 40 which may be dual RS232 with shut down, wherein the shut down is the desired operator. RS232 protocol is commonly know in the art, therefor, a detailed description is not necessary for an understanding of this invention. The interface switches between Echoplex and PB232 protocol based upon whether the IICA received a logic "1" or a logic "0".

Assume that IICA 24 is connected between postage scale 12 and peripherals 31. Upon initiation, postage scale 12 transmits a data signal to IICA 24. Peripheral 31 transmits a logic signal to IICA 24. In a preferred embodiment, the logic "1" is a 5 volt signal and the logic "0" is an open circuit.

When a logic "1" signal is returned, analog switches 38 and 40 are enabled and disengage or shut down. In shut down, analog switch 38 provides communication from postage scale 12 through the enabled analog switch to PB232 meter 32 while preventing data transmission to converter 36.

Simultaneously, shut down of analog switch 40 allows postage meter 32 to send a trip signal through enabled analog switch 40 to initiate tripping of mailing machine 26.

Upon start up, IICA 24 is physically connected between the postage scale 12 and the peripheral devices. IICA 24 then detects whether or not the connection is maintained. If IICA 24 determines the connection is maintained, IICA 24 then determines if it has received a data signal from the weighing scale. If IICA 24 has received a data signal from postage scale 12, IICA then determines if it has received a signal from peripheral devices 31. IICA 24 then determines whether the signal is a logic "1" signal or a logic "0" signal. If the signal is a logic "1", IICA 24 enables analog switches 38 and 40. Enabling analog switches 38 and 40 allows the data signal transmitted from the postage scale 12 to be transmitted without conversion through IICA enabled switches 38 to PB232 meter 32. PB232 meter 32 then transmits a separate signal through enabled switch 40 directly to mailing machine 26. Mailing machine 26 then prints proper postage as indicated by postage scale 12.

If, however, the signal received by IICA 24 is a logic "0" signal, IICA 24 does not enable analog switches 38 and 40, thus maintaining a connection and transmitting the data signal to converter 36. Converter 36 then converts the data signal to correspond with the protocol of Echoplex meter 30. The converted signal is transmitted to Echoplex meter 30 while converter 36 simultaneously transmits a signal through switch 40, which is unenabled, to trip, or signal, mailing machine 26 to print postage.

Without PB232 meter 32 connected to IICA 24, analog switches 38 and 40 remain closed. Postage scale 12 transmits data through analog switch 38 to converter 36 which converts PB232 data to or Echoplex data signal. The Echoplex data signal is then transmitted to Echoplex meter 30, while converter 36 also initiates the trip signal to which is then sent through closed analog switch 40 to trip mailing machine 26.

Figure 3:
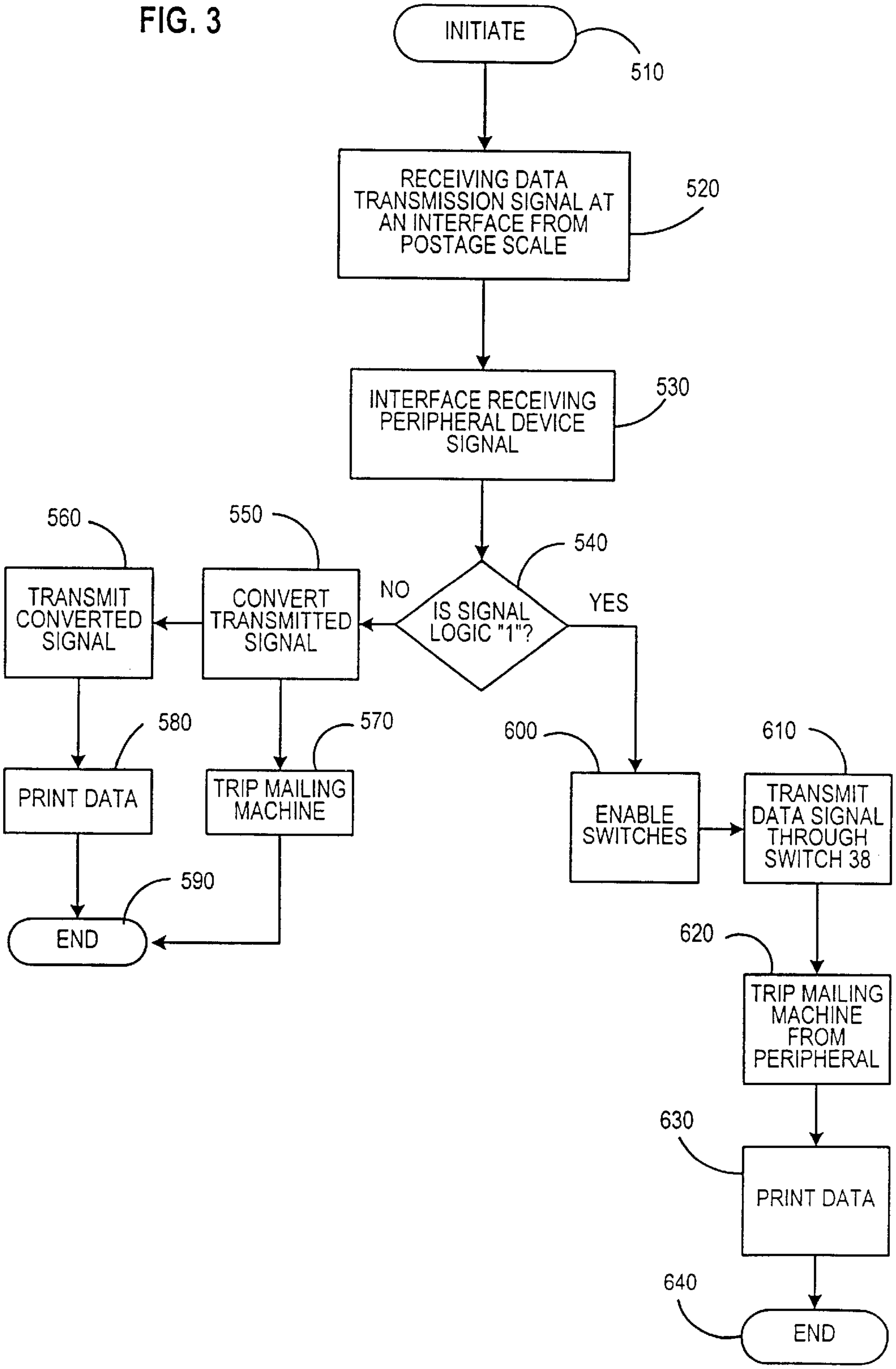
FIG. 3 is a flow chart illustrating a portion of the basic routine for interface operation.
Figure 4:
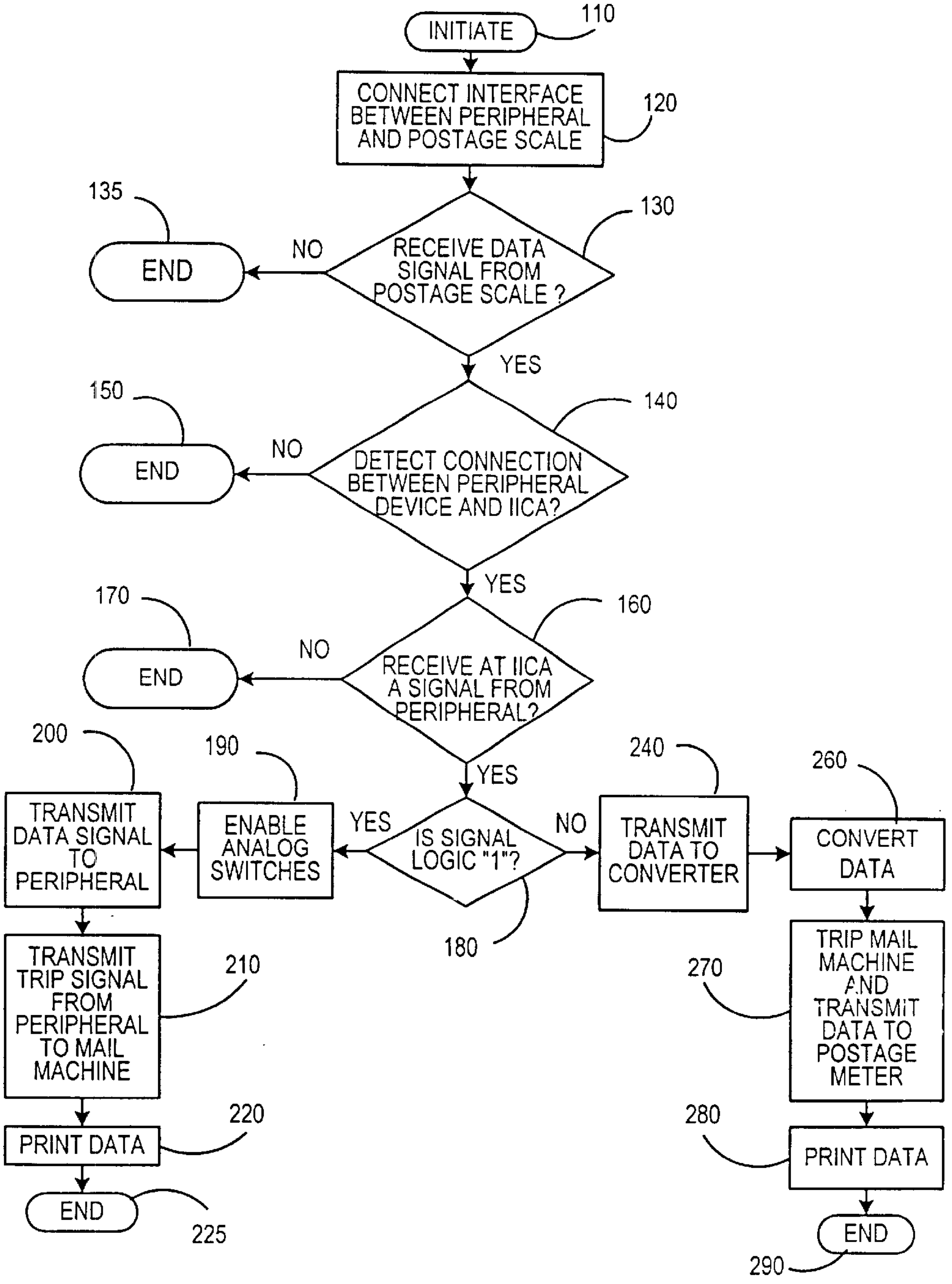
FIG. 4 is a flow chart illustrating a portion of the basic routine for interface operation.

Referring now to FIG. 3 and FIG. 4, the method for the basic operation of the IICA is shown.

In FIG. 3, at step 510, the system is initiated. The method then proceeds to step 520 where the IICA 24 receives a data transmission signal from postage scale 12. At step 530, IICA 24 receives a signal from peripheral device 31. At step 540, IICA 24 determines whether the peripheral device signal is a logic "1" or a logic "0". If IICA 24 determines the signal to be a logic "1," the method proceeds to step 600 where switch 38 and switch 40 are enabled. The method continues at step 610 where the signal is then transmitted through the first enabled switch 38 to the peripheral device.

Finally, at step 630 the transmitted signal is printed and the system ends at step 640. However, if at step 540 IICA 24 determines the signal to be a logic "0", then the method continues to step 550 where the data transmission signal is maintained. At step 550, the data signal is transmitted to converter 36. IICA 24 converter 36 alters the data signal to correspond with the signal of the peripheral device. At step 560, the IICA 24 then transmits the maintained signal to the peripheral device.

Tripping a mailing machine may occur simultaneously with the conversion step 550. If IICA 24 detects a logic "0", the tripping signal is initiated at step 570 from IICA 24. If IICA 24 detects a logic "1", then the trip signal is initiated at step 620 from the peripheral device through enabled switch 40. Finally the data transmission signal is printed by mailing machine 26 at steps 580 and 630.

Now turning to FIG. 4, the method begins at step 110 where the system is initiated. The method proceeds to step 120 where IICA 24 is connected between postage scale 12 and one or more peripheral devices 31.

The method proceeds to step 130 and determines if the IICA received a Data Signal from Postage Scale 12. If the response to the query is "yes" then the method proceeds to step 140, if the response to the query is "no" the method ends at step 135. At step 140, the method queries whether a connection between one or more peripheral device 31, and IICA 24 has been detected. If the answer to the query is "yes", the method proceeds to step 160. If the answer to the query is "no" the method ends at step 150. At step 160 the method queries if the IICA has received a signal from one or more peripheral devices 31. If the response to the query is "yes", the method continues at step 180. If the response to the query is "no" the method ends at step 170. At step 180 the method queries whether the signal received from step 160 is a logic "1".

If the response to the query at step 180 is "yes" then the method proceeds to step 190 and the analog switches are enabled. The method proceeds to step 200 where the IICA transmits the data signal to one or more peripheral devices 31. The method proceeds to step 210 where the peripheral device trips the mailing machine. The method continues at step 210 when the data is printed. Finally, at step 225 the method ends. If the response to the inquiry at step 180 is "no", the method proceeds to 240 where data is transmitted to converter. The method proceeds to step 260 where the data signal is converted. The method continues to step 270 where the mail machine is tripped simultaneously while transmitting the data to the postage meter 32. The method proceeds to step 280 where the data is printed. Finally, at step 290 the method ends.

While the present invention has been disclosed and described with reference to a single embodiment thereof, it will be apparent, as noted above, that variations and modifications may be made therein. It is also noted that the present invention is independent of the machine being controlled and is not limited to controlling machines. It is thus intended, in the following claims, to cover each variation and modification that falls within the true spirit and scope of the present invention.

What is claimed is:

1. A method for interfacing a weighing scale and one or more peripheral devices, the steps comprising:

(a) receiving at an interface device a data transmission from said weighing scale;

(b) receiving at said interface device a peripheral device protocol from each one of said one or more peripheral devices;

(c) determining at said interface device whether said peripheral device protocol from each of said one or more peripheral devices is a logic "1" or a logic "0"; and, (A) if said determined protocol is a logic "1", then;

(i) enabling a first switch and a second switch; and, (ii) transmitting said data transmission through said first enabled switch to said one or more peripheral devices corresponding to the determining protocol being logic "1" and maintaining said data transmission;

(B) if said determined protocol is logic "0"; then;

(i) transmitting said data transmission to a converter;

(ii) converting said data transmission to correspond with said peripheral device protocol at the converter; and (iii) transmitting said converted data transmission to said one or more peripheral devices corresponding to the determining protocol being logic "0" to complete said interface;

(d) tripping a mailing machine by initiating said tripping from said interface device if said interface device detects a logic "0"; or initiating said tripping from said one or more peripheral devices corresponding to said determined protocol being logic "1" through said enabled second switch when said interface device detects a logic "1"; and, (e) printing said data transmission.

2. A method for interfacing between incompatible systems, the steps comprising:

(a) connecting an interface device between a first system having a first protocol and one or more peripheral devices, each of said one or more peripheral devices having a second protocol;

(b) detecting a connection between said first system and one of said one or more peripheral devices at said interface device;

(c) receiving at said interface device a second protocol from each of said one or more peripheral devices;

(d) determining at said interface device whether the second protocol is a logic "1" or a logic "0";

(e) switching said first protocol to correspond to said second protocol by utilizing said interface device if said second protocol is a logic "0"; or maintaining said first protocol if said second protocol is a logic "1";

(f) transmitting data from the first system using said switched first protocol to said one or more peripheral devices corresponding to the determined second protocol being logic "0" or transmitting data from the first system using said maintained first protocol to said one or more peripheral devices corresponding to the determined second protocol being logic "1"; and (g) tripping a mailing machine by initiating said tripping from said interface device if said interface device detects said logic "0"; or, initiating said tripping from said one or more peripheral devices corresponding to the determined second protocol being logic "1" when said interface device detects said logic "1".

3. The method of claim 2 wherein said logic "1" is a predetermined range of voltage.

4. The method of claim 2 wherein said logic "1" is a 5 volt signal.

5. The method of claim 2 wherein said logic "0" is an open circuit.

6. The method of claim 2 wherein one or more of said one or more peripheral devices comprises an Echoplex meter.

7. The method of claim 2 wherein one or more of said one or more peripheral devices comprises an PB232 meter.

8. The method of claim 2 wherein said scale comprises a PB232 scale.

9. An apparatus for interfacing a weighing scale and one or more peripheral devices, said apparatus comprising:

(a) a first end, said end being connected to said weighing scale;

(b) a second end, said second end being connected to said one or more peripheral devices;

(c) a switching means, positioned between said first end and said second end, for activating a first transmit line when said switching means receiving a logic "1" from said one or more peripheral devices; or for activating a second transmit line when said switching means receives a logic "0" from said one or more peripheral devices;

(d) a trip means for tripping a meter initiating said tripping from said switching means detects a logic "0"; or initiating said tripping from said one or more peripheral devices associated with the activation of the first transmit line when said switching means detects a logic "1".

10. The apparatus of claim 9 wherein said apparatus comprises a cable.

11. The apparatus of claim 9 wherein said scale and said apparatus are co-located.

12. The apparatus of claim 9 wherein said one or more peripheral devices and said apparatus are co-located.

13. The apparatus of claim 9 wherein said scale comprises a PB232 scale.

14. The apparatus of claim 9 wherein one or more of said one or more peripheral devices comprises an Echoplex meter.

15. The apparatus of claim 9 wherein one or more of said one or more peripheral devices comprises a PB232 meter.

16. The apparatus of claim 9 wherein one or more of said one or more peripheral devices comprises an Echoplex optical device.

17. The apparatus of claim 9 wherein said switching means is analog.

18. A system for interfacing a weighing scale and a set of one or more peripheral devices, said system comprising:

(a) said weighing scale having a first protocol;

(b) a set of one or more peripheral devices, each of said one or more peripheral devices having a second protocol;

(c) an interface device operatively connected between said weighing scale and said set of one or more peripheral devices, said interface device including: (i) a first data transmission line, (ii) one or more second data transmission lines; and, (iii) a switch means connecting said first transmission line with each of said one or more second data transmission lines;

(d) said switch means being activated when said first protocol does not correspond with said second protocol; or said switch means remaining inactve when said first protocol does correspond to said second protocol;

(e) trip means for tripping a mailing machine, said trip means being activated at said interface device when said switch means is activated; or said trio means being activated at said one or more peripheral devices having said second protocol corresponding to said first protocol when said switch means remains inactive.

* * * * *